US011019053B2

(12) United States Patent
Hamel et al.

(10) Patent No.: US 11,019,053 B2
(45) Date of Patent: May 25, 2021

(54) REQUESTING CREDENTIALS

(71) Applicant: Workday, Inc., Pleasanton, CA (US)

(72) Inventors: Bjorn Hamel, Dublin, CA (US); Jonathan David Ruggiero, Danville, CA (US)

(73) Assignee: Workday, Inc., Pleasanton, CA (US)

( * ) Notice: Subject to any disclaimer, the term of this patent is extended or adjusted under 35 U.S.C. 154(b) by 265 days.

(21) Appl. No.: 16/021,234

(22) Filed: Jun. 28, 2018

(65) Prior Publication Data
US 2019/0306143 A1     Oct. 3, 2019

Related U.S. Application Data

(60) Provisional application No. 62/648,854, filed on Mar. 27, 2018.

(51) Int. Cl.
*H04L 29/06* (2006.01)
*H04L 9/32* (2006.01)
(Continued)

(52) U.S. Cl.
CPC ............ *H04L 63/083* (2013.01); *G06F 16/27* (2019.01); *G06F 21/31* (2013.01); *G06F 21/45* (2013.01); *G06F 21/604* (2013.01); *G06Q 10/105* (2013.01); *H04L 9/0819* (2013.01); *H04L 9/0891* (2013.01); *H04L 9/3213* (2013.01); *H04L 9/3226* (2013.01);
(Continued)

(58) Field of Classification Search
CPC . H04L 63/083; H04L 63/0428; H04L 9/0819; H04L 9/0891; H04L 9/3213; H04L 9/3226; H04L 9/3247; G06F 16/27; G06F 21/31; G06F 21/45; G06F 21/604; G06Q 10/105

See application file for complete search history.

(56) References Cited

U.S. PATENT DOCUMENTS 6,662,299 B1   12/2003   Price, III
7,437,755 B2   10/2008   Farino
(Continued)

FOREIGN PATENT DOCUMENTS

CA      2606326      11/2006
DE      19882328     5/2014
(Continued)

OTHER PUBLICATIONS

Ori Jacobovitz. "Blockchain for identity management." The Lynne and William Frankel Center for Computer Science Department of Computer Science. Dec. 2016 (Dec. 2016) Retrieved on May 27, 2019 from https://www.cs.ogu.ac.il/~frankel/TrechnicalReports/2016/16-02.pdf.

*Primary Examiner* — Noura Zoubair
(74) *Attorney, Agent, or Firm* — Van Pelt. Yi & James LLP

(57) ABSTRACT

The system for providing an application includes an interface and a processor. The interface is configured to receive a providing indication to provide the application to a device. The processor is configured to provide the application to the device. The application is configured to receive login information associated with a user; receive an adding indication to add a credential; provide an available indication of credentials available to the user; create a credential request; provide the credential request to a server system; receive the credential; and store the credential.

25 Claims, 15 Drawing Sheets

(51) Int. Cl.
*G06F 21/31* (2013.01)
*G06F 21/45* (2013.01)
*G06F 16/27* (2019.01)
*G06F 21/60* (2013.01)
*G06Q 10/10* (2012.01)
*H04L 9/08* (2006.01)
*G06F 21/62* (2013.01)

(52) U.S. Cl.
CPC ........ H04L 9/3247 (2013.01); H04L 63/0428 (2013.01); *G06F 21/6245* (2013.01)

(56) References Cited

U.S. PATENT DOCUMENTS

| | | | |
|---|---|---|---|
| 7,735,120 | B2 | 6/2010 | Wallace |
| 8,719,952 | B1 | 5/2014 | Damm-Goossens |
| 9,419,968 | B1 | 8/2016 | Pei |
| 9,485,096 | B2 | 11/2016 | Shrivastava |
| 9,490,984 | B2 | 11/2016 | Leicher |
| 9,672,538 | B1 | 6/2017 | Vaynblat |
| 9,749,140 | B2 | 8/2017 | Oberhauser |
| 10,460,313 | B1 | 10/2019 | Clark |
| 2002/0176583 | A1 | 11/2002 | Buttiker |
| 2004/0177276 | A1 | 9/2004 | MacKinnon |
| 2006/0200856 | A1 | 9/2006 | Salowey |
| 2008/0148373 | A1 | 6/2008 | Adams |
| 2008/0301553 | A1 | 12/2008 | Basu |
| 2009/0119756 | A1 | 5/2009 | Acuna |
| 2011/0113484 | A1 | 5/2011 | Zeuthen |
| 2012/0079570 | A1 | 3/2012 | Fu |
| 2013/0030989 | A1 | 1/2013 | Geller |
| 2013/0125231 | A1 | 5/2013 | Kuenzi |
| 2014/0079221 | A1 | 3/2014 | McCallum |
| 2014/0181927 | A1 | 6/2014 | Sarkissian |
| 2014/0187149 | A1 | 7/2014 | Lortz |
| 2014/0222682 | A1* | 8/2014 | Dua ................. G06Q 20/32 705/44 |
| 2014/0281525 | A1 | 9/2014 | Acar |
| 2015/0089244 | A1 | 3/2015 | Roth |
| 2015/0278824 | A1 | 10/2015 | Zabar |
| 2016/0149896 | A1 | 5/2016 | Sarkissian |
| 2016/0162896 | A1 | 6/2016 | Grigg |
| 2017/0005804 | A1 | 1/2017 | Zinder |
| 2017/0005809 | A1 | 1/2017 | Adam |
| 2017/0012784 | A1 | 1/2017 | Cross |
| 2017/0041151 | A1* | 2/2017 | Kommireddy ........ H04L 9/3228 |
| 2017/0109759 | A1 | 4/2017 | Korb |
| 2017/0155686 | A1 | 6/2017 | Yanacek |
| 2017/0222814 | A1 | 8/2017 | Oberhauser |
| 2017/0277773 | A1 | 9/2017 | Iasi |
| 2017/0317997 | A1 | 11/2017 | Smith |
| 2018/0075247 | A1 | 3/2018 | Campero |
| 2018/0124041 | A1* | 5/2018 | Bhalerao ............. H04L 63/0823 |
| 2018/0159839 | A1 | 6/2018 | Citron |
| 2018/0248859 | A1 | 8/2018 | Zudic |
| 2019/0036710 | A1 | 1/2019 | Qiu |

FOREIGN PATENT DOCUMENTS

| | | |
|---|---|---|
| WO | 2010083522 | 7/2010 |
| WO | 2017085546 | 5/2017 |
| WO | 2017127564 | 7/2017 |

* cited by examiner

REQUESTING CREDENTIALS

CROSS REFERENCE TO OTHER APPLICATIONS

This application claims priority to U.S. Provisional Patent Application No. 62/648,854 entitled SYSTEM FOR ISSUANCE, VERIFICATION, AND REVOCATION OF CREDENTIALS filed Mar. 27, 2018 which is incorporated herein by reference for all purposes.

BACKGROUND OF THE INVENTION

Modern users of database systems (e.g., human resources database systems or financial database systems) rely on the database systems for access to their personal information or verification information (e.g., salary, tax details, employment status, etc. or university degree, certifications, criminal record, ownership, etc.). Users trust the database systems to contain correct information. When a user desires to provide personal information or verification information from the database system to another database system (for example, providing previous employment or salary information to a potential employer, providing previous insurance information to a potential employer), the user typically accesses the information on the database system and then provides the information manually to the other database system (e.g., by inputting data into an electronic form or uploading digital paperwork). The user trusts the information it receives from the database system, however the other database system cannot have the same level of trust in the information it receives from the user. There is a problem wherein it is difficult to trust data as it passes from system to system via a human.

BRIEF DESCRIPTION OF THE DRAWINGS

Various embodiments of the invention are disclosed in the following detailed description and the accompanying drawings.

DETAILED DESCRIPTION

Figure 1:
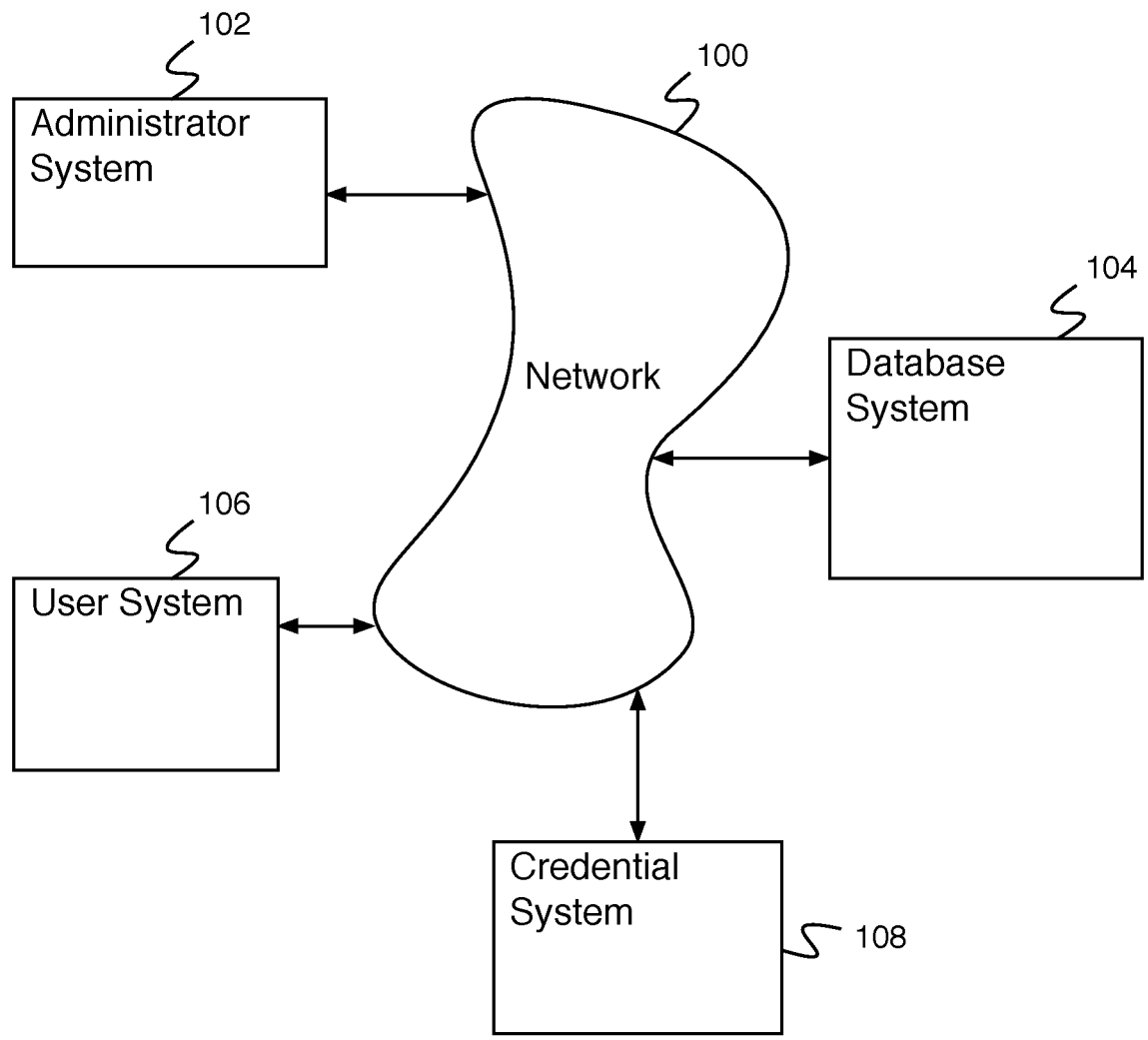
FIG. 1 is a block diagram illustrating an embodiment of a network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for providing an application comprises an interface configured to receive an indication to provide the application to a device, and a processor configured to provide the application to the device. The application is configured to receive login information associated with a user, receive an adding indication to add a credential, provide an available indication of credentials available to a user, create a credential request, provide the credential request to a server system, receive the credential, and store the credential.

A system for requesting credentials to be issued comprises an interface configured to receive login information associated with a user and receive an adding indication to add a credential; and a processor configured to provide an available indication of credentials available to a user, create a credential request, provide the credential request to a server system, receive the credential, and store the credential.

A system for requesting credentials to be issued comprises a system for a user system (e.g., a computing system for use by a user) interacting with a database system. The database system further interacts with a credential issuing system. The database system stores user information for the user. The database system further determines a set of credentials available to the user based on the user information as well as record of previously issued credentials. The credentials comprise categories satisfied by the user information at differing levels of specificity (e.g., greater than an amount, in a range of amounts, less than an amount, etc.). For example, in the case where the user comprises an employee earning $95,000 per year, the database system could determine credentials available to the user indicating that the user earns more than $60,000 per year, that the user earns more than $80,000 per year, that the user earns in the range of $90,000-$100,000 per year, etc. When the user interacts with the database system using a credential requesting app or application, the database system determines the set of credentials available to the user and provides the list of credentials to the credential requesting app or application. The user can then request that one or more available credentials be downloaded to local storage using the credential requesting app or application.

In various embodiments, a credential comprises data that is validated or verified to be authentic—for example, data verifying academic diplomas, academic degrees, certifications, security clearances, identification documents, badges, passwords, user names, keys, powers of attorney, human resource data, personal information, or any other relevant information, When a user indicates to download a credential, a credential request is created on the user system and provided to the database system. The database system determines whether the credential is valid for the user, and in the event the credential is valid for the user, the database system requests the credential from the credential server. The credential server generates the credential and provides it to the database system. The credential server generates the credential in such a way that its validity is publicly verifiable (e.g., cryptographic keys used for verification can be found in a public or semi-public distributed ledger system). The database system determines privacy information associated with the credential (e.g., a description of the personal information or verification information) of the user indicated by the credential) and provides the credential and privacy information to the user system. The user system receives and stores the credential and privacy information.

When the user later desires to share personal information, the user can provide the credential to a different database system. The different database system verifies the validity of the credential and stores the information it indicates. By enabling the transfer of personal information or verification information (e.g., salary, tax details, employment status, etc. or university degree, certifications, criminal record, ownership, etc.) between disparate database systems using authenticated credentials, this system allows that transfer of information with a level of trust and security not previously accomplished. This allows the reduction or elimination of problems such as data theft during information transfer and misrepresentation of personal information.

The system is a better computer system enabling efficient secure distribution of information. For example, the system is set up to securely receive and provide information. The security protocols and the distributed ledger storage enable credentialing data and being able to act as a trusted source for the data.

In some embodiments, a technology other than a secure distributed ledger is used for securely storing public keys that enable the verifiability of data. In some embodiments, a shared accessible network accessible medium is used to distribute public keys associated with the verifiability of authenticated credentials. This shared public network could be an open model like Twitter where users tweet the public key information (keybase.io does this), or a semi-private shared database of public keys for which the participants in the credentials exchanges all have authenticated access via a set of RESTful APIs to fetch keys for credential verification.

FIG. 1 is a block diagram illustrating an embodiment of a network system. In some embodiments, the network system of FIG. 1 comprises a network system for a system for validating data. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. Administrator system 102, database system 104, user system 106, and credential system 108 communicate via network 100. Administrator system 102 comprises an administrator system for use by an administrator. Administrator system 102 comprises an administrator system for executing administrator commands, for configuring database system 104, etc. Database system 104 comprises a database system for providing user access to data stored in a tenanted area of database system 104 (e.g., access to add data, view data, modify data, delete data, access reports, execute business processes, etc.). Database system 104 additionally comprises a system for providing a credential to a user. The credential comprises a digital token that may be provided to a different database system securely indicating user data.

User system 106 comprises a user system for use by a user. A user uses a user system to interact with database system 104, for example to store database data, to request database data, to request reporting based on database data, to request a credential based on database data, etc. In some embodiments, the network system of FIG. 1 comprises a plurality of user systems associated with one or more users.

A user uses user system 106 to provide an indication to database system 104 requesting a credential (e.g., a credential based on data stored by database system 104). User system 106 receives login information associated with a user, determines credentials available to the user, and provides an indication of the credentials available to the user. User system 106 then receives an indication to add a credential (e.g., one of the credentials available to the user), creates a credential request, and provides the credential request to a server system (e.g., database system 104). User system 106 then receives and stores the credential.

Upon receiving the credential request, database system 104 verifies that the user has access to the credential (e.g., that the credential is valid for the user) and in the event that the user has access to the credential, database system 104 requests the credential from credential system 108. Database system 104 receives the credential from credential system 108 and provides it to user system 106.

Figure 2:
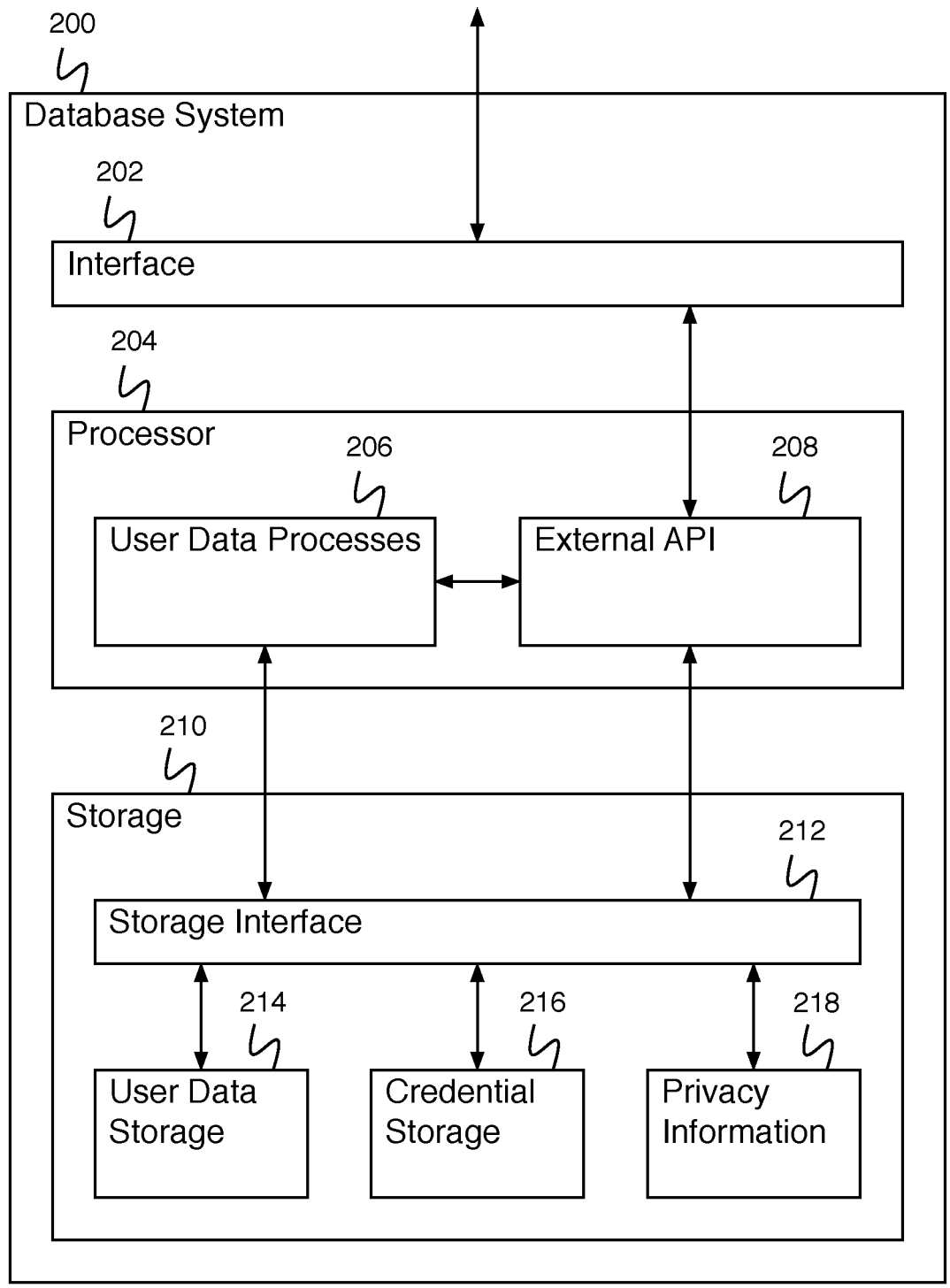
FIG. 2 is a block diagram illustrating an embodiment of a database system.

FIG. 2 is a block diagram illustrating an embodiment of a database system. In some embodiments, database system 200 comprises database system 104 of FIG. 1. In the example shown, database system 200 comprises interface 202, processor 204, and storage 210. Interface 202 comprises an interface for communicating with processor 204 and with an external network (e.g., network 100 of FIG. 1, for communication with an administrator system, a user system, a credential system, etc.). Processor 204 comprises a processor for processing data, performing computations, controlling communications, etc. Processor 204 comprises external API (e.g., application programming interface) 208 for interacting with external systems, allowing external systems to request processor 204 perform actions, etc. User data processes 206 comprises a set of processes for manipulating (e.g., reading, writing, modifying, deleting, etc.) user data (e.g., user data stored in user data storage 214) and credentials (e.g., credentials stored in credential storage 216). User data processes 206 and external API 208 communicate with data stored in storage 210 via storage interface 212. User data storage 214 comprises user data describing users associated with database system 200. Credential storage 216 comprises credentials accessed by database system 200. Privacy information 218 comprises privacy information associated with credentials stored by credential storage 216. Database system 200 receives a request for a credential associated with a user (e.g., a user for the credential) and associated with a credential identifier (e.g., a credential identifier identifying the requested credential). Database system 200 then determines that the credential identifier is valid for the user (e.g., that the user is entitled to the indicated credential), determines privacy information associated with the requested credential, and provides the credential request to a credential server. Database system 200 receives the credential from the credential server and provides the credential, the privacy information, and the credential identifier (e.g., to the requesting user system).

Figure 3:
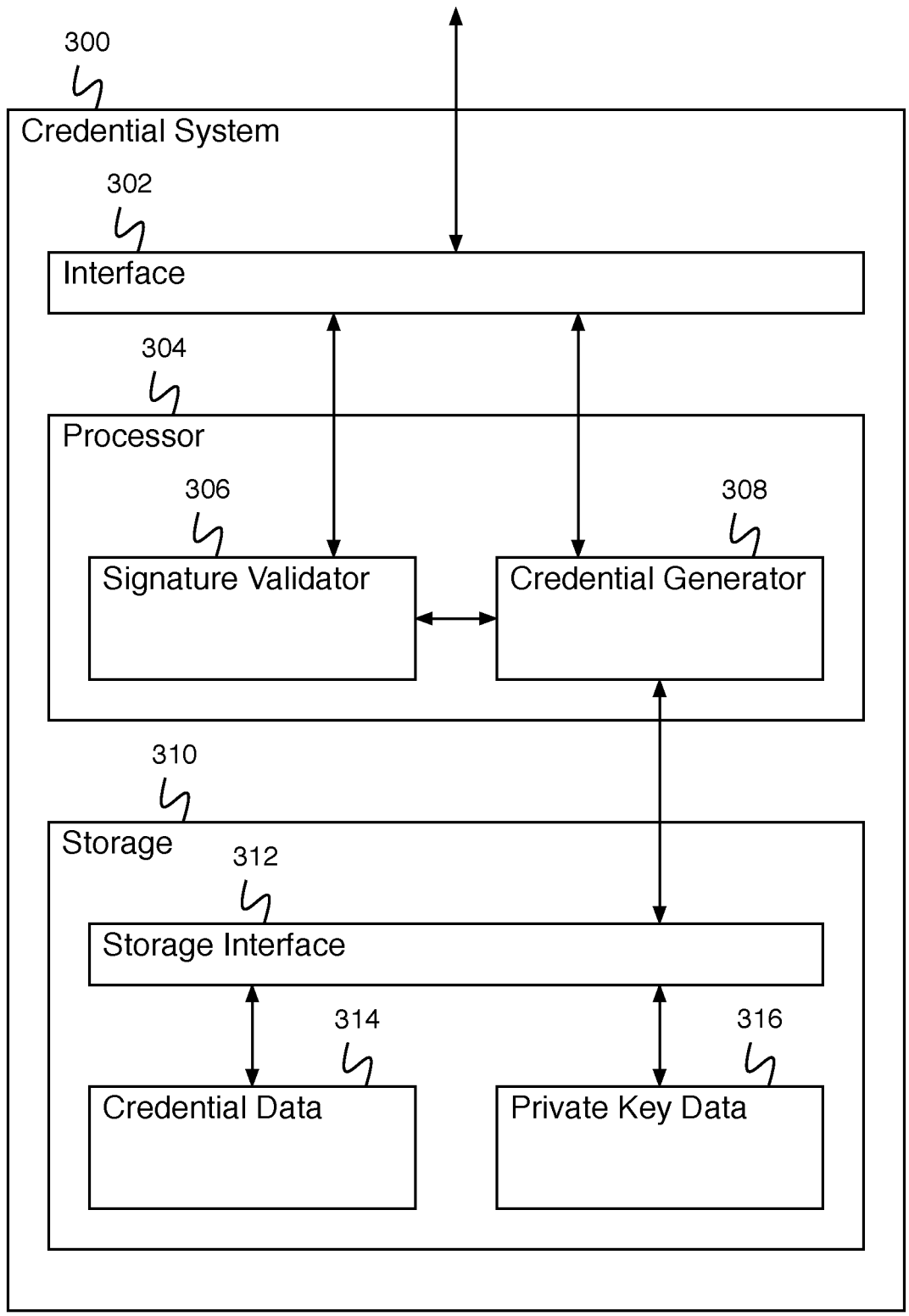
FIG. 3 is a block diagram illustrating an embodiment of a credential system.

FIG. 3 is a block diagram illustrating an embodiment of a credential system. In some embodiments, credential system 300 comprises credential system 108 of FIG. 1. In the example shown, credential system 300 comprises interface 302, processor 304, and storage 310. Interface 302 comprises an interface for communicating with processor 304 and with an external network (e.g., network 100 of FIG. 1, for communication with an administrator system, a user system, a database system, etc.). Processor 304 comprises a processor for processing data, performing computations, controlling communications, etc. Processor 304 comprises signature validator 306 and credential generator 308. Signature validator 306 comprises a signature validator for validating a digital signature (e.g., a signature received as part of a credential request). Credential generator 308 comprises a credential generator for generating a credential (e.g., a credential generator for generating a credential based at least in part on a private key, a credential generator for cryptographically generating a credential, etc.). Credential generator 308 interacts with credential data 314 and private key data 316 of storage 310 via storage interface 312.

Figure 4:
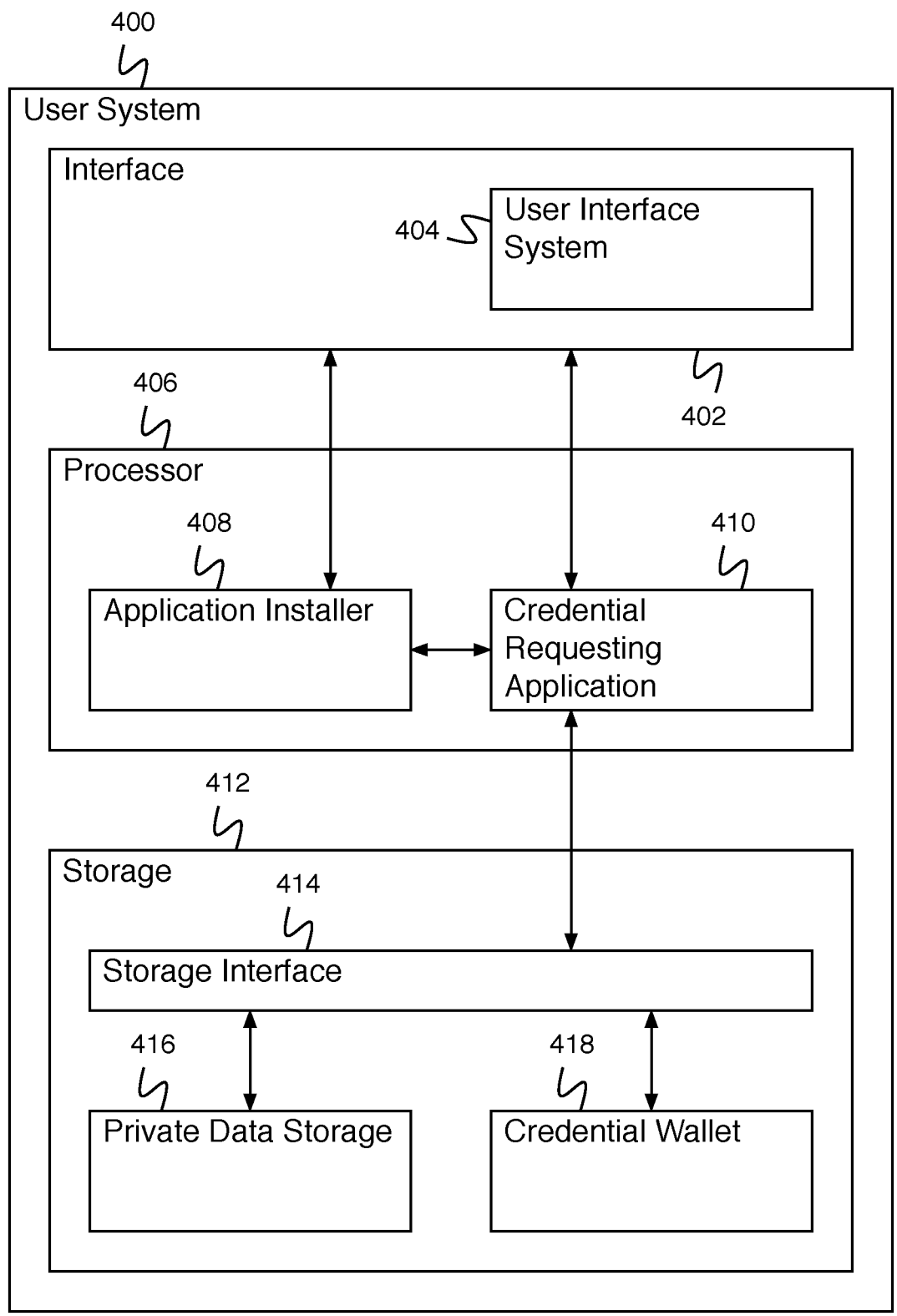
FIG. 4 is a block diagram illustrating an embodiment of a user system.

FIG. 4 is a block diagram illustrating an embodiment of a user system. In some embodiments, user system 400 of FIG. 4 comprises user system 106 of FIG. 1. In various embodiments, user system 400 comprises a personal computer, a mobile device, a tablet computer, etc. In the example shown, user system 400 comprises interface 402, processor 406, and storage 412. Interface 402 comprises an interface for communicating with processor 406 and with an external network (e.g., network 100 of FIG. 1, for communication with an administrator system, a database system, a credential system, etc.). Interface 402 additionally comprises user interface system for providing a user interface for interacting with a user. Processor 406 comprises a processor for processing data, performing computations, controlling communications, etc. Processor 406 comprises application installer 408 and credential requesting application 410. Application installer 408 comprises an application installer for receiving an application from an external server and installing the application on user system 400. For example, credential requesting application 410 is installed by application installer 408. Any other appropriate applications are additionally installed by application installer 408. Credential requesting application 410 comprises an application for interacting with a database system to request a credential. Credential requesting application 410 interacts with private data storage 416 and credential wallet 418 of storage 412 via storage interface 414.

Credential requesting application 410 receives login information associated with a user (e.g., via user interface system 404). Credential requesting application 410 then requests information describing credentials available to the user (e.g., from a database system), receives the information describing the credentials available to the user, and provides an indication of the credentials available to the user (e.g., via user interface system 404). Credential requesting system 410 then receives an indication to add a credential (e.g., of the credentials available to the user), creates a credential request, and provides the credential request to a server system (e.g., a database system). Credential requesting application 410 then receives the credential and stores the credential (e.g., in credential wallet 418).

Figure 5A:
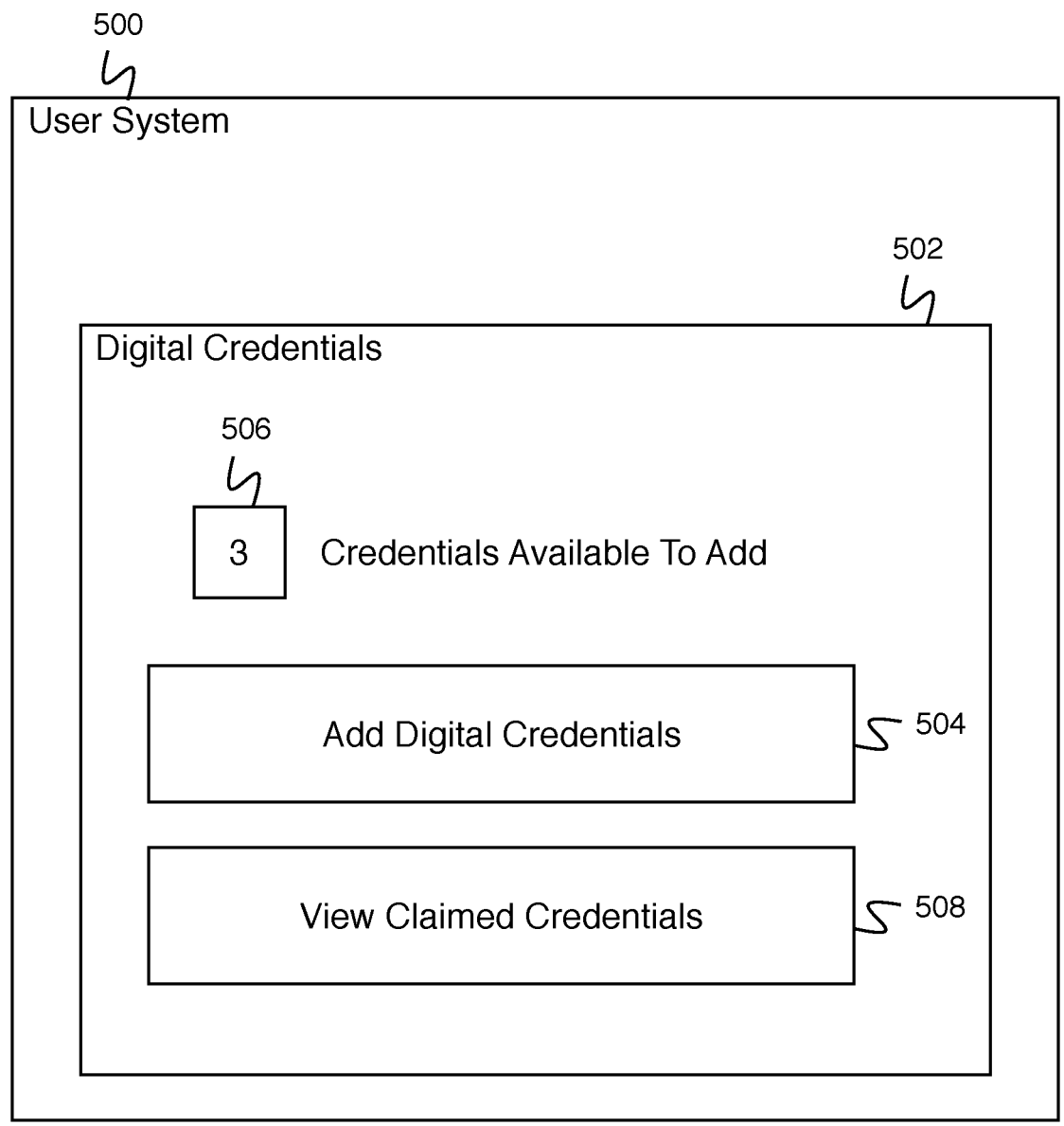
FIG. 5A is a diagram illustrating an embodiment of a user interface for a user system.

FIG. 5A is a diagram illustrating an embodiment of a user interface for a user system. In some embodiments, the user interface of FIG. 5A comprises a user interface provided by user interface system 404 of FIG. 4. In the example shown, user system 500 displays digital credentials window 502. Digital credentials window 502 displays add credentials button 504 and view claimed credentials button 508. Add credentials button 504 comprises number of available credentials button 506. Number of available credentials button 506 is updated with a current number of available credentials—for example, a current number of available credentials is updated on a schedule, each time a user accesses digital credentials window 502, etc. User system 500 updates number of available credentials button 506 by querying a server using user identifying information for the number of available credentials. In the event the user makes an indication to add credentials button 504, the user is provided a list of available credentials to add. In the event the user makes an indication to view claimed credentials button 508, the user is provided a list of already claimed credentials for viewing.

Figure 5B:
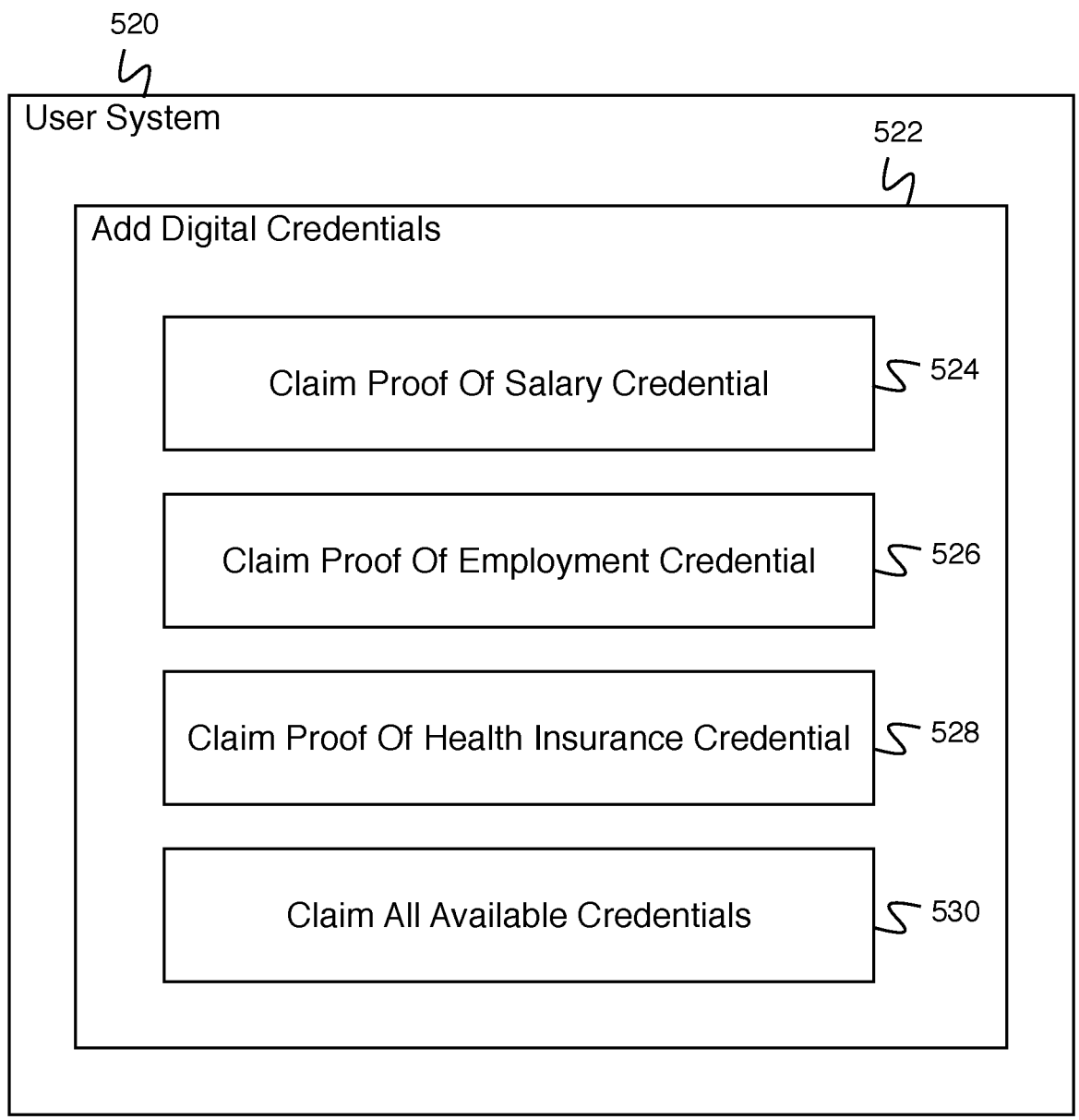
FIG. 5B is a diagram illustrating an embodiment of a user interface for a user system.

FIG. 5B is a diagram illustrating an embodiment of a user interface for a user system. In some embodiments, the user interface of FIG. 5B comprises a user interface provided by user interface system 404 of FIG. 4. In the example shown, user system 520 displays add digital credentials window 522. For example, add digital credentials window 522 is shown in response to an indication to an add digital credentials button (e.g., add digital credentials button 504 of FIG. 5A). In the example shown, add digital credentials window 522 displays claim proof of salary credential button 524, claim proof of employment credential button 526, claim proof of health insurance credential button 528, and claim all available credentials button 530. In the event the user makes an indication to a button, a process is started to claim the appropriate credential or credentials.

Figure 5C:
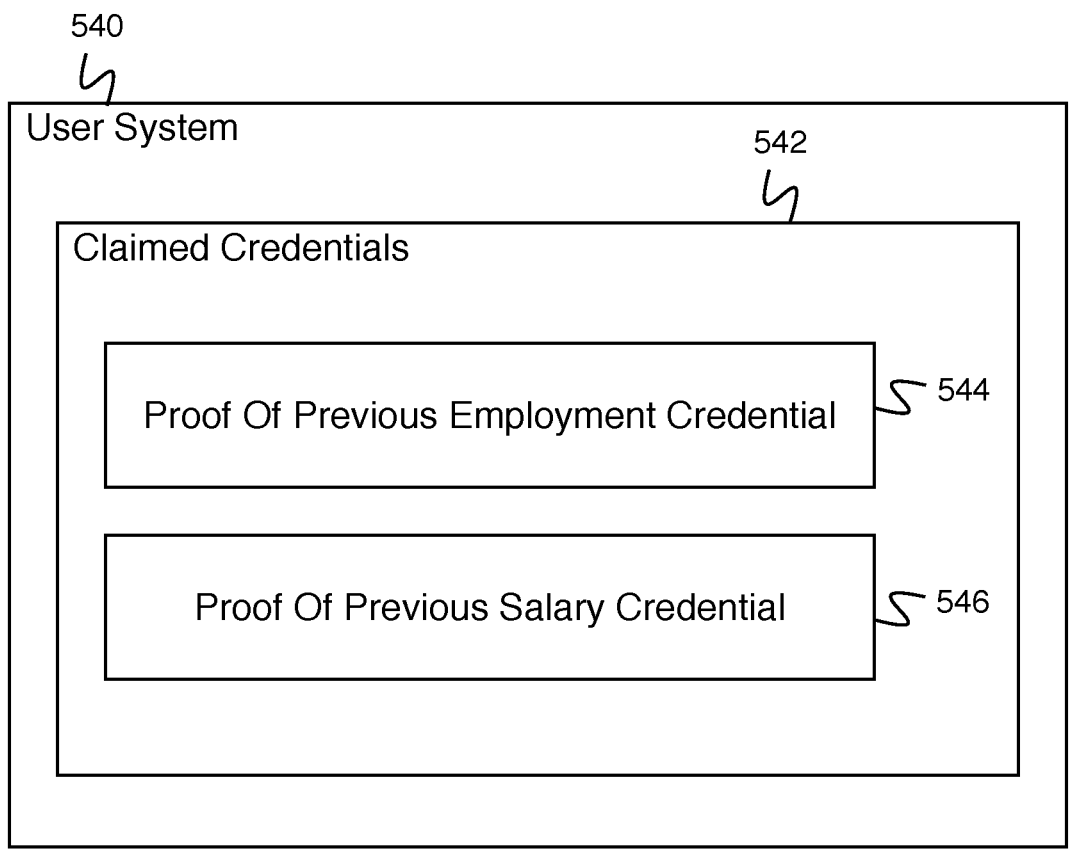
FIG. 5C is a diagram illustrating an embodiment of a user interface for a user system.

FIG. 5C is a diagram illustrating an embodiment of a user interface for a user system. In some embodiments, the user interface of FIG. 5C comprises a user interface provided by user interface system 404 of FIG. 4. In the example shown, user system 540 displays claimed credentials window 542. For example, claimed credentials window 542 is shown in response to an indication to a view claimed credentials button (e.g., view claimed credentials button 508 of FIG. 5A). In the example shown, claimed credentials window 542 displays proof of previous employment credential button 544 and proof of previous salary credential button 546. In the event the user makes an indication to a button, information associated with the credential is displayed. For example, credential privacy information is displayed, credential associated data is displayed, a credential access date is displayed, a credential expiration date is displayed, etc.

Figure 6:
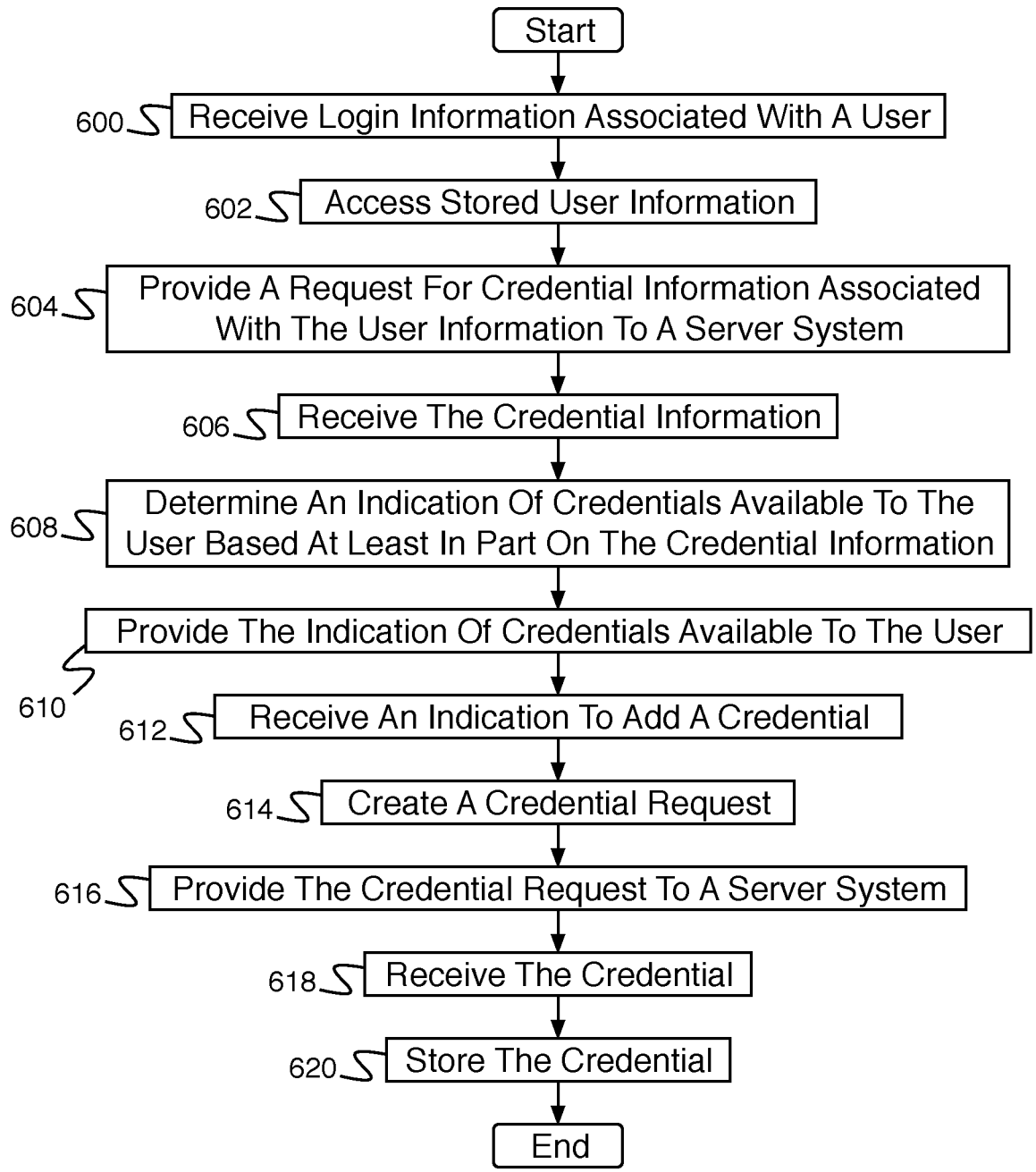
FIG. 6 is a flow diagram illustrating an embodiment of a process for requesting credentials to be issued.

FIG. 6 is a flow diagram illustrating an embodiment of a process for requesting credentials to be issued. In some embodiments, the process of FIG. 6 is executed by a user system (e.g., user system 106 of FIG. 1). In the example shown, in 600, login information associated with a user is received. In 602, stored user information is accessed. In 604, a request for credential information associated with the user information is provided to a server system. In 606, the credential information is received. In 608, an indication of credentials available to the user is determined based at least in part on the credential information. For example, the credentials available are available based upon a user identity (e.g., who the user is), what the credentialing service knows it has already given the user, or any other appropriate credential. In 610, the indication of credentials available to the user is provided (e.g., to the user via a user interface). In 612, an indication to add a credential is received. In 614, a credential request is created. In 616, the credential request is provided to a server system. In 618, the credential is received. In 620, the credential is stored.

Figure 7:
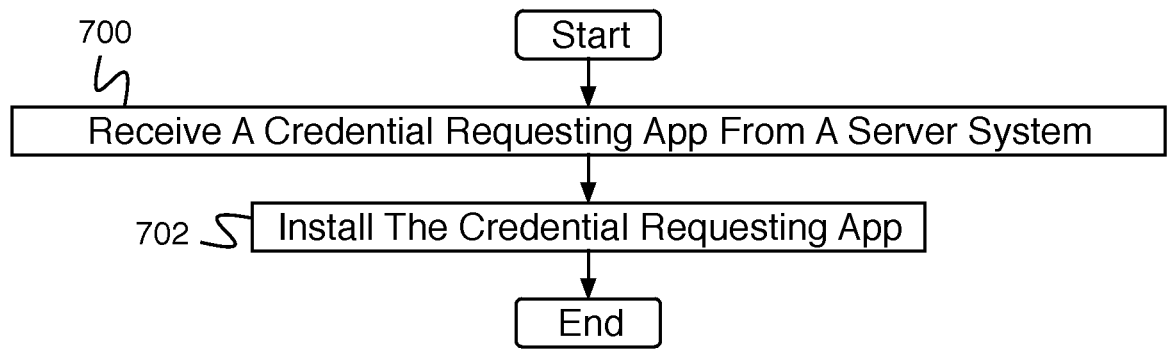
FIG. 7 is a flow diagram illustrating an embodiment of a process for installing an app.

FIG. 7 is a flow diagram illustrating an embodiment of a process for installing an app. In some embodiments, the process of FIG. 7 is executed by application installer 408. In the example shown, in 700, a credential requesting app is received from a server system. In 702, the credential requesting app is installed.

Figure 8:
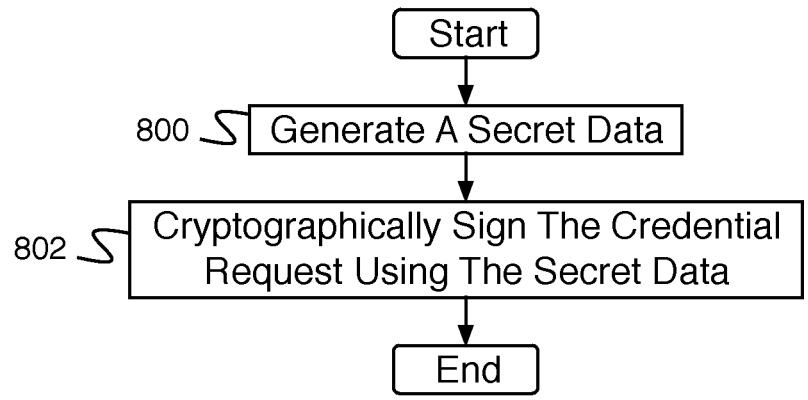
FIG. 8 is a flow diagram illustrating an embodiment of a process for creating a credential request.

FIG. 8 is a flow diagram illustrating an embodiment of a process for creating a credential request. In some embodiments, the process of FIG. 8 implements 614 of FIG. 6. In the example shown, in 800, a secret data is generated. In 802, the credential request is cryptographically signed using the secret data.

Figure 9:
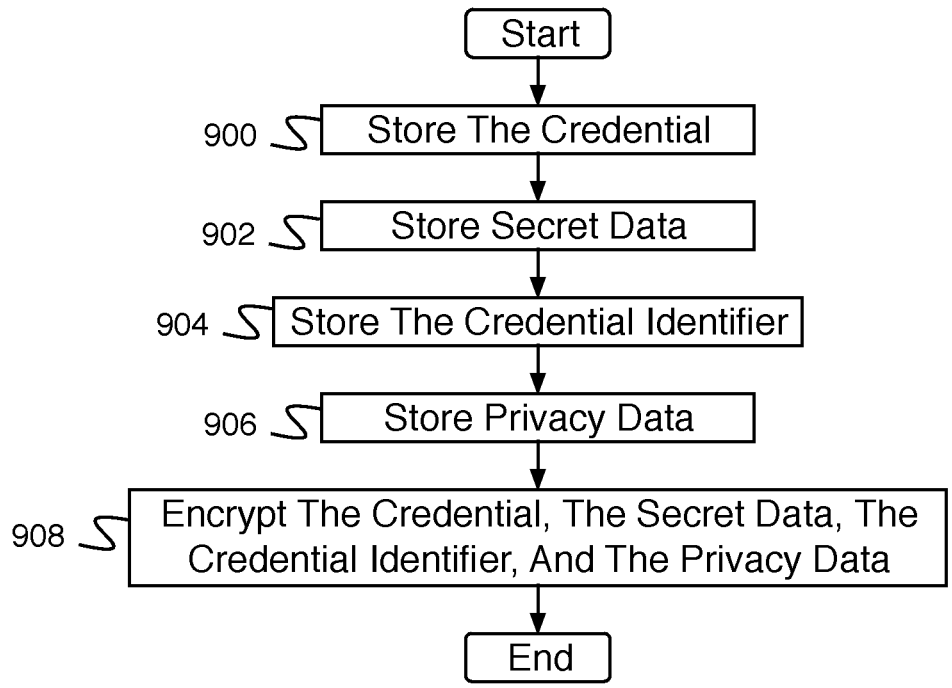
FIG. 9 is a flow diagram illustrating an embodiment of a process for storing a credential.

FIG. 9 is a flow diagram illustrating an embodiment of a process for storing a credential. In some embodiments, the process of FIG. 9 implements 620 of FIG. 6. In the example shown, in 900, the credential is stored. In 902, secret data is stored. In 904, the credential identifier is stored. In 906, the privacy data is stored. For example, privacy data is stored as metadata. In 908, the credential, the secret data, the credential identifier, and the privacy data are encrypted.

Figure 10:
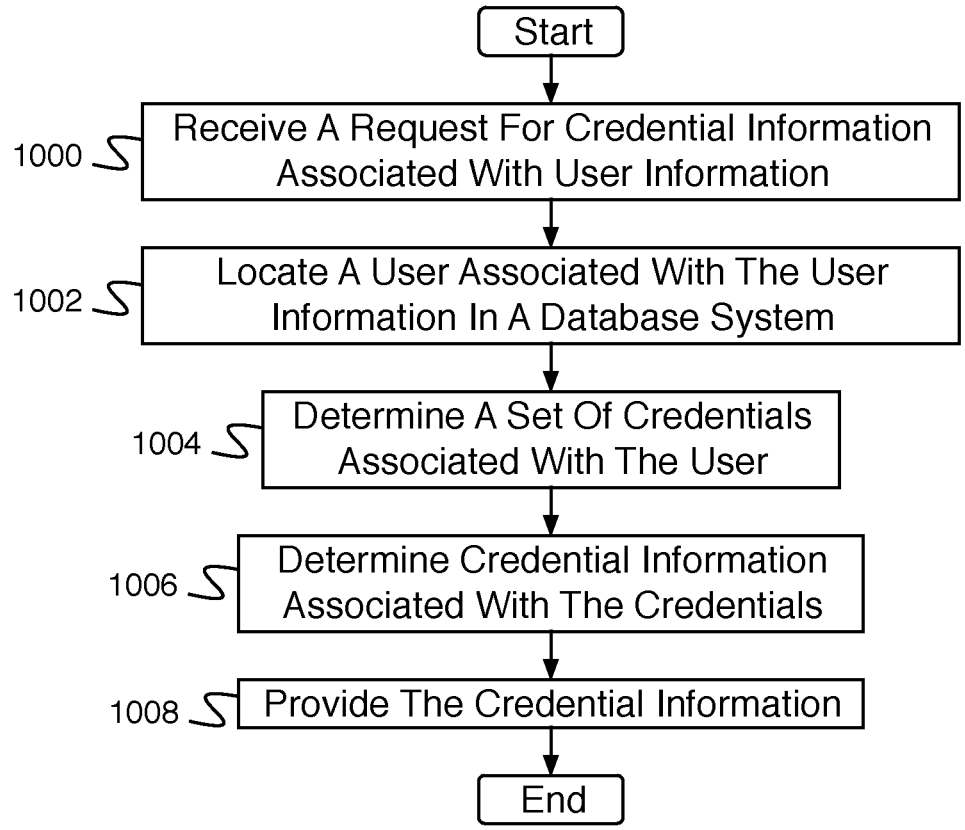
FIG. 10 is a flow diagram illustrating an embodiment of a process for providing credential information.

FIG. 10 is a flow diagram illustrating an embodiment of a process for providing credential information. In some embodiments, the process of FIG. 10 is executed by database system 104 of FIG. 1 in response to a request for credential information. In the example shown, in 1000, a request for credential information associated with user information is received. In 1002, a user associated with the user information is located in a database system. In 1004, a set of credentials associated with the user is determined. In 1006, credential information associated with the credentials is determined. In 1008, the credential information is provided.

Figure 11:
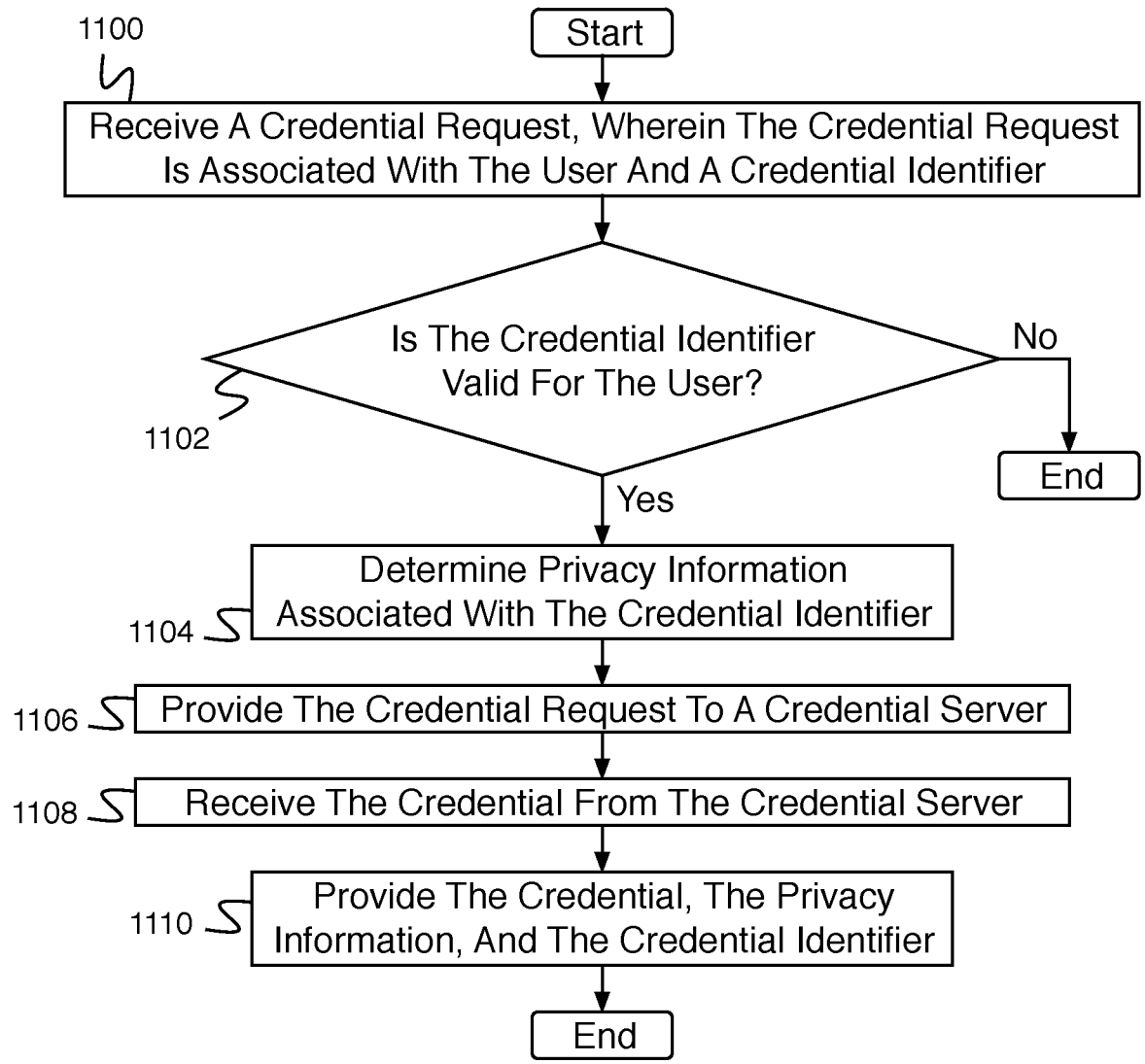
FIG. 11 is a flow diagram illustrating an embodiment of a process for providing a credential.

FIG. 11 is a flow diagram illustrating an embodiment of a process for providing a credential. In some embodiments, the process of FIG. 11 is executed by database system 104 in response to a request for a credential. In the example shown, in 1100, a credential request is received, wherein the credential request is associated with the user and a credential identifier. In 1102, it is determined whether the credential identifier is valid for the user. In the event it is determined that the credential identifier is not valid for the user, the process ends. In the event it is determined that the credential identifier is valid for the user, control passes to 1104. In 1104, privacy information associated with the credential identifier is determined. In 1106, the credential request is provided to a credential server. In 1108, the credential is received from the credential server. In 1110, the credential, the privacy information, and the credential identifier are provided.

In some embodiments, the credential server comprises a third party credential server.

Figure 12:
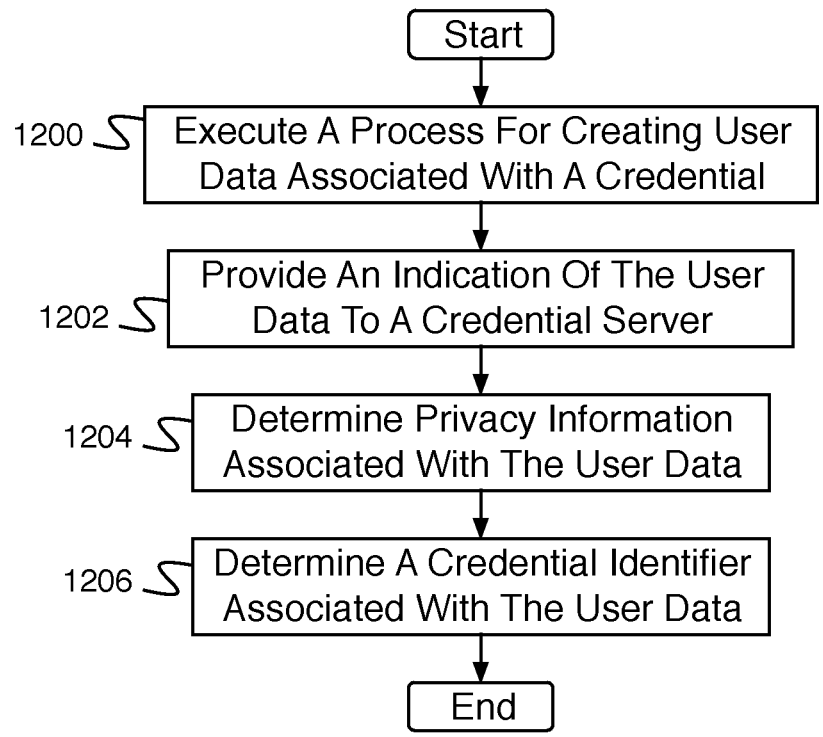
FIG. 12 is a flow diagram illustrating an embodiment of a process for indicating availability of a new credential.

FIG. 12 is a flow diagram illustrating an embodiment of a process for indicating availability of a new credential. In some embodiments, the process of FIG. 11 is executed by database system 104 in response to an indication to execute a process to create new data. In the example shown, in 1200, a process for creating user data associated with a credential is executed. In 1202, an indication of the user data is provided to a credential server. In 1204, privacy information associated with the user data is determined. In 1206, a credential identifier associate with the user data is determined.

Figure 13:
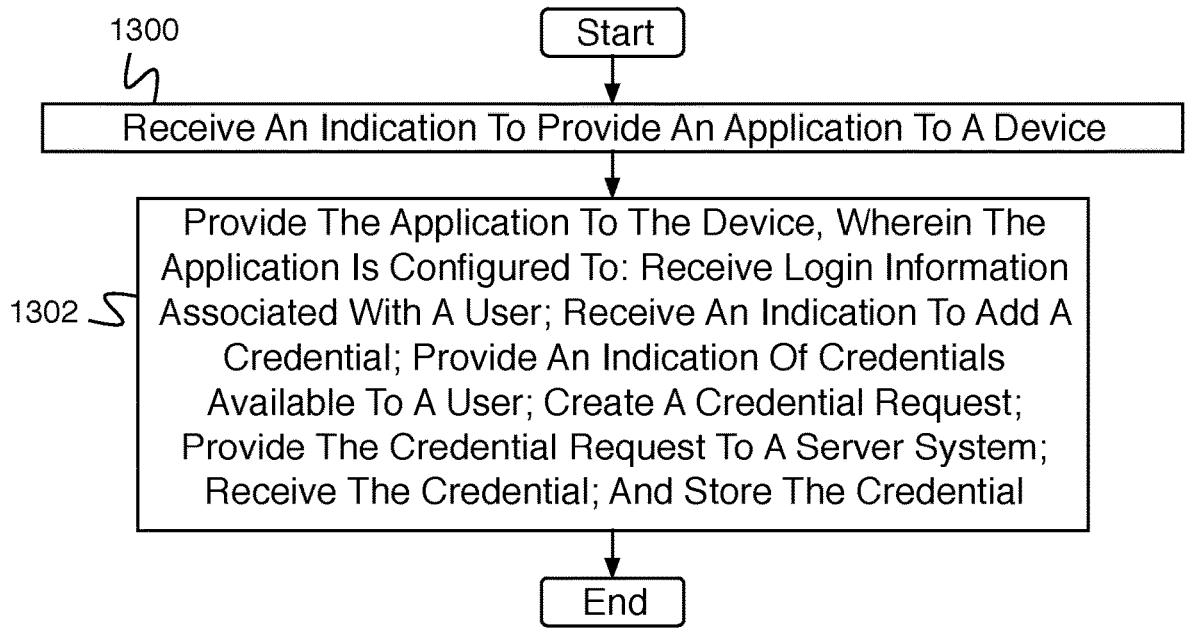
FIG. 13 is a flow diagram illustrating an embodiment of a process for providing an application.

FIG. 13 is a flow diagram illustrating an embodiment of a process for providing an application. In some embodiments, the process of FIG. 13 is executed by database system 104 of FIG. 1. In the example shown, in 1300, an indication is received to provide an application to a device. In 1302, the application is provided to the device, wherein the application is configured to: receive login information associated with a user, receive an indication to add a credential, provide an indication of credentials available to a user, create a credential request, provide the credential request to a server system, receive the credential, and store the credential.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for providing an application, comprising:
   an interface configured to:
      receive a providing indication to provide an application to a device; and
   a hardware processor configured to:
      provide the application to the device, wherein the application is configured to:
         receive login information associated with a user;
         receive information describing a set of credentials available to be issued from a server system, wherein the server system determines the set of credentials based at least in part on user information and a record of previously issued credentials;
         provide an available indication of credentials available to the user, wherein the credentials available to the user comprise the set of credentials;
         receive an adding indication to add a credential of the set of credentials to a credential wallet, wherein the device comprises the credential wallet;
         create a credential request for the credential;
         provide the credential request to the server system, wherein the server system obtains the credential from a credential issuing system, wherein the credential comprises data associated with the user that is validated to be authentic;
         receive the credential from the server system; and
         store the credential in the credential wallet, wherein the credential stored in the credential wallet is provided by the user to an other server system, wherein the credential wallet includes a first credential comprising credential information for a category at a first level of specificity and a second credential comprising credential information for the category at a second level of specificity, wherein the first level of specificity is different from the second level of specificity.

2. The system of claim 1, wherein the processor is further configured to:
receive a credential requesting application issued by the server system; and
install the credential requesting application.

3. The system of claim 1, wherein the available indication of credentials available to the user comprises a number of credentials available to the user.

4. The system of claim 1, wherein the processor is further configured to:
access stored user information;
provide a request for credential information associated with the stored user information to the server system;
receive the credential information, wherein the credential information comprises the information describing the set of credentials available to be issued from the server system; and
determine the available indication of credentials available to the user based at least in part on the credential information.

5. The system of claim 4, wherein the stored user information comprises a user identifying credential.

6. The system of claim 4, wherein determining the available indication of credentials available to the user comprises determining that the credential has not expired.

7. The system of claim 4, wherein the credential information comprises a credential identifier associated with the credential.

8. The system of claim 4, wherein the available indication of credentials available to the user comprises a stored indication of credentials stored in a third party credential store.

9. The system of claim 1, wherein the credential request is associated with a credential identifier associated with the credential.

10. The system of claim 1, wherein creating the credential request comprises:
generating a secret data; and
cryptographically signing the credential request using the secret data.

11. The system of claim 1, wherein storing the credential comprises:
storing the credential, a secret data, a credential identifier, and privacy metadata about the credential; and
encrypting the credential, the secret data, the credential identifier, and the privacy metadata.

12. The system of claim 1, wherein receiving the credential additionally comprises receiving credential privacy metadata.

13. The system of claim 1, wherein storing the credential additionally comprises storing credential privacy metadata.

14. The system of claim 1, wherein the processor is further configured to provide a credential privacy metadata for display to the user.

15. The system of claim 1, wherein the processor is further configured to provide credential expiration data for display to the user.

16. The system of claim 1, wherein the credential comprises a current employment credential, a previous employment credential, a salary credential, or a salary range credential.

17. The system of claim 1, wherein the server system is configured to:

receive a request for credential information associated with the user information;
locate the user associated with the user information in a database system;
determine a set of credentials associated with the user;
determine credential information associated with the set of credentials associated with the user; and
provide the credential information, wherein the credential information comprises the information describing the set of credentials available to be issued from the server system.

18. The system of claim 1, wherein the server system is configured to:
receive the credential request, wherein the credential request is associated with the user and a credential identifier;
determine that the credential identifier is valid for the user;
determine privacy information associated with the credential identifier;
provide the credential request to a credential server;
receive the credential from the credential server; and
provide the credential, the privacy information, and the credential identifier.

19. The system of claim 1, wherein the server system is configured to:
execute a process for creating user data associated with the credential;
provide a user data indication of the user data to a credential server;
determine privacy information associated with the user data; and
determine a credential identifier associated with the user data.

20. The system of claim 1, wherein the server system is configured to:
receive the credential request, wherein the credential request is associated with the user and a credential identifier;
determine that the credential identifier is valid for the user;
determine privacy information associated with the credential identifier;
determine that the credential identifier is associated with a third party server;
provide the credential request to the third party server;
receive the credential from the third party server; and
provide the credential, the privacy information, and the credential identifier.

21. The system of claim 20, wherein the third party server is configured to:
receive the credential request from the server system;
determine that the credential is valid for the user;
provide the credential request to a credential server;
receive the credential from the credential server; and
provide the credential.

22. The system of claim 1, wherein the credential comprises one of a proof of salary credential, a proof of employment credential, a proof of education credential, a proof of security clearance credential, a proof of identity credential, and a proof of insurance credential.

23. The system of claim 1, wherein the application is further configured to:
receive a display indication to display information associated with the credential; and
display information associated with the credential, wherein the displayed information associated with the credential comprises one or more of credential privacy information, a credential access date, and a credential expiration date.

24. A method for providing an application, comprising:
receiving a providing indication to provide an application to a device; and
providing the application to the device using a processor, wherein the application is configured to:
  receive login information associated with a user;
  receive information describing a set of credentials available to be issued from a server system, wherein the server system determines the set of credentials based at least in part on user information and a record of previously issued credentials;
  provide an available indication of credentials available to the user, wherein the credentials available to the user comprise the set of credentials;
  receive an adding indication to add a credential of the set of credentials to a credential wallet, wherein the device comprises the credential wallet;
  create a credential request for the credential;
  provide the credential request to the server system, wherein the server system obtains the credential from a credential issuing system, wherein the credential comprises data associated with the user that is validated to be authentic;
  receive the credential from the server system; and
  store the credential in the credential wallet, wherein the credential stored in the credential wallet is provided by the user to an other server system, wherein the credential wallet includes a first credential comprising credential information for a category at a first level of specificity and a second credential comprising credential information for the category at a second level of specificity, wherein the first level of specificity is different from the second level of specificity.

25. A computer program product for providing an application, the computer program product being embodied in a non-transitory computer readable storage medium and comprising computer instructions for:
receiving a providing indication to provide an application to a device; and
providing the application to the device, wherein the application is configured to:
  receive login information associated with a user;
  receive information describing a set of credentials available to be issued from a server system, wherein the server system determines the set of credentials based at least in part on user information and a record of previously issued credentials;
  provide an available indication of credentials available to the user, wherein the credentials available to the user comprise the set of credentials;
  receive an adding indication to add a credential of the set of credentials to a credential wallet, wherein the device comprises the credential wallet;
  create a credential request for the credential;
  provide the credential request to the server system, wherein the server system obtains the credential from a credential issuing system, wherein the credential comprises data associated with the user that is validated to be authentic;
  receive the credential from the server system; and
  store the credential in the credential wallet, wherein the credential stored in the credential wallet is provided by the user to an other server system, wherein the credential wallet includes a first credential comprising credential information for a category at a first level of specificity and a second credential comprising credential information for the category at a second level of specificity, wherein the first level of specificity is different from the second level of specificity.

* * * * *

UNITED STATES PATENT AND TRADEMARK OFFICE
CERTIFICATE OF CORRECTION

Page 1 of 1

PATENT NO. : 11,019,053 B2
APPLICATION NO. : 16/021234
DATED : May 25, 2021
INVENTOR(S) : Hamel It is certified that error appears in the above-identified patent and that said Letters Patent is hereby corrected as shown below:

On the Title Page

Item [74], delete "Van Pelt. Yi & James LLP" and insert --Van Pelt, Yi & James LLP--, therefor.

Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*